(12) United States Patent
Goker et al.

(10) Patent No.: US 11,929,092 B2
(45) Date of Patent: Mar. 12, 2024

(54) SYSTEM AND METHOD FOR CONDITIONING NEW LTO MEDIA (71) Applicant: QUANTUM CORPORATION, San Jose, CA (US)

(72) Inventors: Turguy Goker, Oceanside, CA (US); James P. Peng, Santa Maria, CA (US); George Saliba, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 39 days.

(21) Appl. No.: 17/743,840

(22) Filed: May 13, 2022

(65) Prior Publication Data

US 2022/0375498 A1 Nov. 24, 2022

Related U.S. Application Data (60) Provisional application No. 63/189,810, filed on May 18, 2021.

(51) Int. Cl.
*G11B 5/41* (2006.01)
*G11B 15/467* (2006.01)
*G11B 23/50* (2006.01)

(52) U.S. Cl.
CPC ........ *G11B 15/4673* (2013.01); *G11B 23/502* (2013.01)

(58) Field of Classification Search
CPC .......... G11B 2020/836; G11B 5/00813; G11B 20/1816; G11B 5/41; G11B 15/026; G11B 15/60; G11B 23/049; G11B 23/502; G11B 20/1833; G11B 20/1211; G11B 2020/1275

USPC .......................................... 360/75, 132, 137
See application file for complete search history.

(56) References Cited

U.S. PATENT DOCUMENTS 10,109,313 B1 * 10/2018 Asmussen .......... G11B 5/00821
11,037,588 B1 *  6/2021 Wiedemann ............. G11B 5/41
2012/0320472 A1 * 12/2012 Thompson ............. G11B 15/68

* cited by examiner

Primary Examiner — Nabil Z Hindi
(74) Attorney, Agent, or Firm — James P. Broder; Anne-Marie Dinius (57) ABSTRACT A tape drive (226) for use in a tape library (10) that retains at least one tape cartridge (220) that retains magnetic tape (250) includes a drive housing (226A) and a media conditioner (255). The drive housing (226A) is configured to receive the tape cartridge (220). The media conditioner (255) is coupled to the drive housing (226A). The media conditioner (255) is configured to condition the magnetic tape (250) when the tape cartridge (220) is received within the drive housing (226A). The media conditioner (255) can be configured to remove at least one of abrasives, contaminants and lubricants that are on the magnetic tape (250) when the tape cartridge (220) is received within the drive housing (226A). The magnetic tape (250) is configured to move along a predefined path (251) within the drive housing (226A), which is defined by one or more rollers (254). The rollers (254) can include a modified roller (270) having a roller body (274) and an outer coating (276) that is affixed on an outer surface (274A) of the roller body (274). The media conditioner (255) can include the modified roller (270).

20 Claims, 2 Drawing Sheets

SYSTEM AND METHOD FOR CONDITIONING NEW LTO MEDIA

RELATED APPLICATION

This application claims priority on U.S. Provisional Application Ser. No. 63/189,810, filed on May 18, 2021 and entitled "SYSTEM AND METHOD FOR LAPPING AND CLEANING NEW LTO MEDIA". As far as permitted, the contents of U.S. Provisional Application Ser. No. 63/189,810 are incorporated in their entirety herein by reference.

BACKGROUND

Automated tape library systems are commonly utilized for purposes of writing data to and reading data from magnetic tape cartridges. Magnetic tape cartridges are configured to retain and/or store magnetic tape that can be used in a magnetic tape drive for purposes of reading data from and writing data to the magnetic tape. Magnetic tape cartridges have been used extensively because they provide a convenient way to house and support a length of magnetic tape for engagement by a transducer (or tape head, sometimes simply referred to as a "head") in the tape drive while protecting the tape upon removal of the cartridge. Moreover, magnetic tape cartridges facilitate economic and compact storage of data. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head, often at high speed. Such tape heads can include dedicated write heads, dedicated read heads, or combination read/write heads.

Unfortunately, new LTO tape media, e.g., especially more recent LTO-8 or LTO-9 tape media (also sometimes referred to generally as "green media") with higher areal density, has too often been found to exhibit or contain high abrasiveness, contaminants, and excessive (or unwanted) lubricants, which can cause undesired tape head damage due to such high abrasiveness, contaminants, and excessive (or unwanted) lubricants. Tape media vendors have attempted to eliminate such issues by trying to control the size and amount of abrasive material in the tape media, as well as burnishing and cleaning the tape media at the source factory. However, despite the best efforts of the tape media vendors, such green media continues to cause excessive tape head wear and media defects that occur at the site of the customers. This is becoming a serious problem for new generations of LTO drives.

SUMMARY

The present invention is directed toward a tape drive for use in a tape library that retains at least one tape cartridge that retains magnetic tape. In various embodiments, the tape drive includes a drive housing and a media conditioner. The drive housing is configured to receive the tape cartridge. The media conditioner is coupled to the drive housing. In various embodiments, the media conditioner is configured to condition the magnetic tape that is retained within the tape cartridge when the tape cartridge is received within the drive housing.

In some embodiments, the media conditioner is configured to remove at least one of (i) abrasives, (ii) contaminants and (iii) lubricants that are on the magnetic tape when the tape cartridge is received within the drive housing. It is appreciated that the media conditioner may be configured to remove only unwanted lubricants, and certain lubricants can remain on the magnetic tape after the conditioning procedure.

In certain embodiments, the magnetic tape is configured to move along a predefined path within the drive housing when the tape cartridge is received within the drive housing.

In some embodiments, the tape drive can further include a drive controller that is configured to control operation of the tape drive. The drive controller is configured to control a lateral tape speed of the magnetic tape as the tape drive moves through the drive housing along the predefined path.

In certain embodiments, the predefined path is defined by one or more rollers that are positioned along the predefined path.

In some embodiments, one of the one or more rollers includes a modified roller having a roller body and an outer coating that is affixed on an outer surface of the roller body. In one embodiment, the media conditioner includes the modified roller.

In certain embodiments, the one or more rollers are configured to rotate at a nominal rotation rate that corresponds to the lateral tape speed as the magnetic tape moves along the predefined path at the lateral tape speed.

In some embodiments, the media conditioner further includes a braking mechanism that is configured to slow rotation of the roller body of the modified roller so that the modified roller rotates at a reduced rotation rate that is less than the nominal rotation rate. In certain embodiments, the reduced rotation rate of the modified roller is less than approximately 75% of the nominal rotation rate.

In some embodiments, the braking mechanism is configured to generate a magnetic field that interacts with a material of the roller body to produce eddy currents that produce a braking force on the roller body so that the modified roller rotates at the reduced rotation rate.

In certain embodiments, the braking mechanism includes a permanent magnet.

In some embodiments, the braking mechanism includes an electromagnet.

In some embodiments, the roller body is formed from a conductive material. For example, in certain embodiments, the roller body is formed of one of aluminum and copper.

In certain embodiments, the outer coating is formed from an abrasive material. For example, in some embodiments, the outer coating is formed from one or more of diamond, diamond-like substance, silica, silicon carbide, aluminum oxide, carborundum, glass, boron oxide and emery.

In some embodiments, the tape drive further includes a head assembly that is coupled to the drive housing. In various embodiments, the magnetic tape moves across the head assembly as the magnetic tape moves along the predefined path so that the head assembly can one of write data to and read data from the magnetic tape.

In certain embodiments, the magnetic tape is conditioned by the media conditioner prior to the magnetic tape moving across the head assembly.

In certain embodiments, the tape drive further includes a debris remover that is configured to catch and remove any debris that has been generated due to the use of the media conditioner.

In some embodiments, the tape cartridge is an LTO-compatible tape cartridge.

The present invention is further directed toward a method for conditioning a magnetic tape that is retained within a tape cartridge, the method including the steps of receiving the tape cartridge within a drive housing of a tape drive;

coupling a media conditioner to the drive housing; and conditioning the magnetic tape that is retained within the tape cartridge with the media conditioner when the tape cartridge is received within the drive housing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a system and method that effectively inhibits tape head damage by burnishing, cleaning and/or lapping tape media, such as magnetic tape, by using a specially designed tape drive equipped with a media conditioner. As used herein, the terms "conditioner" and "conditioning" are intended to include processes such as cleaning, lapping, or otherwise removing debris and/or providing a higher level of consistency of the tape media to remove imperfections or other physical anomalies. As described herein, it is appreciated that such specially designed tape drive can be installed in a standard automated tape library and can function in the same place as a standard LTO tape drive in order to improve reliability of the tape library at the customer site. The tape library can thus utilize such specially designed tape drive to, for example, lap and/or clean the new LTO tape media at the cartridge level in order to inhibit tape head damage from propagating across the tape library, and therefore inhibiting the new LTO tape media from potentially damaging all tape drives in the tape library. More specifically, in such embodiments, conditioning of the magnetic tape can be provided in a grinding-type manner by causing an abrasive material to rub across the surface of the magnetic tape.

It is appreciated, however, that a similar conditioning procedure for the magnetic tape can also be performed outside the confines of such a specially designed tape drive. For example, in certain non-exclusive alternative embodiments, the media conditioner can be included and/or incorporated within a media manufacturing system, which in some instances can be a reel-to-reel based system. One example of which would be where the media conditioner is included and/or incorporated within a servo writing station. Another example of where a substantially similar media conditioner could be used would be within a tape winding system or mechanism.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
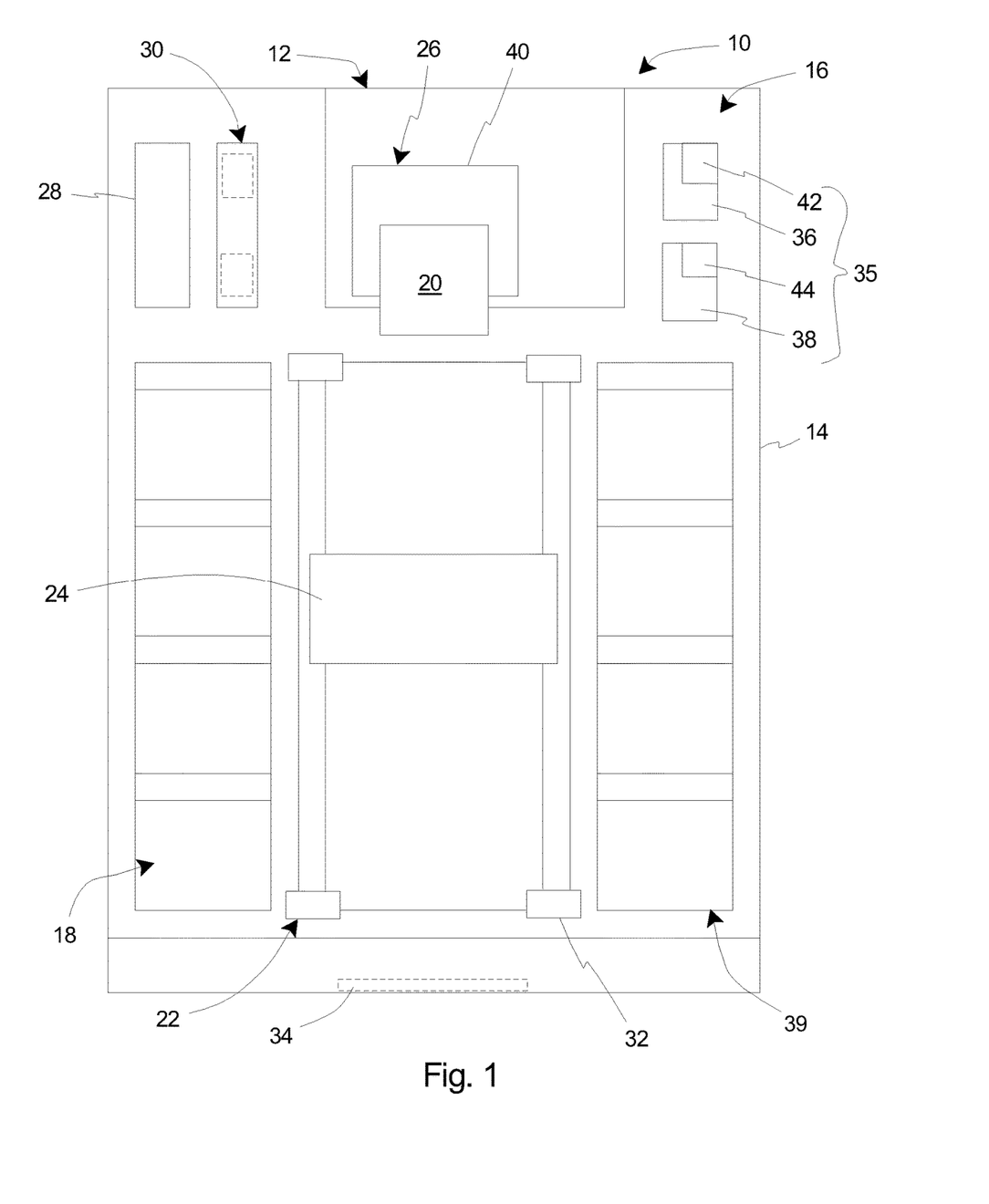
FIG. 1 is a simplified schematic top view illustration of an embodiment of an automated tape library system having features of the present invention.

FIG. 1 is a simplified schematic top view illustration of an automated tape library system 10 (also referred to herein simply as a "tape library") including a tape drive system 12 including at least one tape drive 26 having features of the present invention. In FIG. 1, a top cover (not shown) has been omitted for clarity so that the interior of the media library 10 is visible. The design of the tape library 10 can be varied as desired. In particular, the tape library 10 can have any suitable design that is capable of storing a plurality of tape cartridges and using one or more tape drives to write data to and read data from the plurality of tape cartridges. More specifically, it is noted that the tape library 10 illustrated in FIG. 1 is just one non-exclusive example of a tape library 10 usable with the present invention, and no limitations are intended based on the specific type and/or size of the tape library 10 shown in FIG. 1.

In various embodiments, as illustrated in FIG. 1, the tape library 10 can include one or more of: (i) a library housing 14 that defines a library interior 16, (ii) a plurality of storage slots 18 that are each configured to receive and selectively retain (and store) a tape cartridge 20, (iii) a rack assembly 22, (iv) a tape cartridge retrieval assembly 24 (also sometimes referred to herein as a "retrieval assembly"), (v) the tape drive system 12 including one or more tape drives 26, (vi) a power supply 28, (vii) a library control system 30, (viii) one or more racks 32, (ix) a graphical user interface 34 (illustrated in phantom, and also sometimes referred to herein as a "GUI"), and (x) a climate controller 35. In some embodiments, the climate controller 35 can include one or more temperature controllers 36 (only one temperature controller 36 is illustrated in FIG. 1), and/or one or more humidity controllers 38 (only one humidity controller 38 is illustrated in FIG. 1).

As an overview, at least one tape drive 26 within the tape drive system 12 and/or the tape library 10 is specially modified to include and/or incorporate a media conditioner 255 (illustrated in FIG. 2) that is usable to condition magnetic tape 250 (illustrated in FIG. 2) that is retained within the tape cartridge 20. Thus, through use of the specially designed tape drive 26 with the media conditioner 255, the magnetic tape 250 can be effectively conditioned, thereby removing excessive abrasives, contaminants and/or unwanted lubricants that may otherwise be present on the magnetic tape 250. The use of such specially designed tape drive 26 with each tape cartridge 20 can also be configured to occur before the tape cartridge 20 is used within any of the other tape drives 26 that do not include the media conditioner 255, so as to more effectively inhibit the magnetic tape 250 within the tape cartridge 20 from damaging tape head(s) 256 (illustrated in FIG. 2) of any of the tape drives 26 in the tape library 10.

Figure 2:
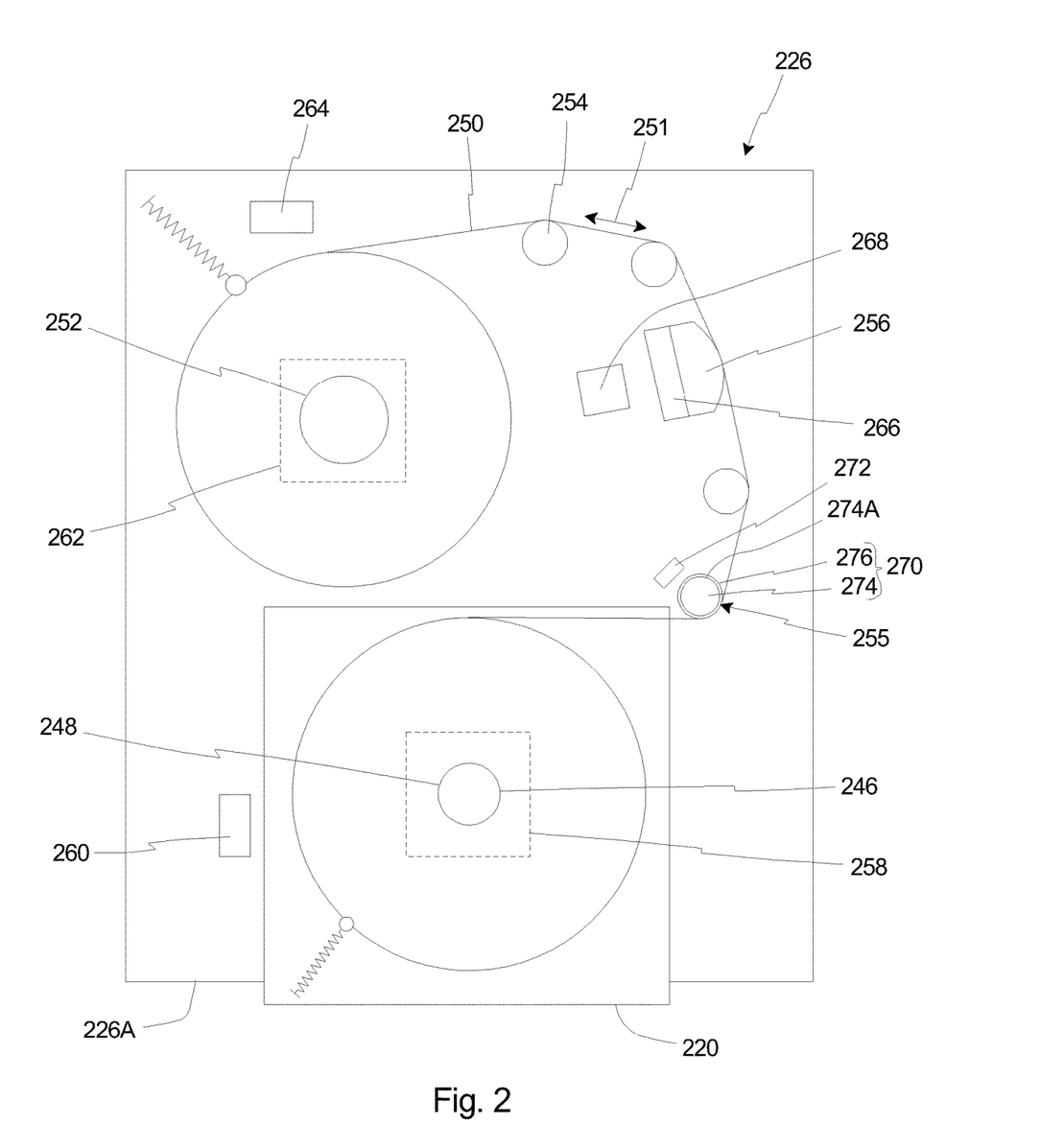
FIG. 2 is a simplified schematic top view illustration of a tape drive having features of the present invention, and a tape cartridge that has been inserted into the tape drive, which can be included as part of the tape library system illustrated in FIG. 1.

It is appreciated that although the present invention is generally illustrated and described herein as being used within a specially designed tape drive, the concept of the media conditioner 255 is not intended to be limited in such manner. For example, it is appreciated that a similar conditioning procedure for the magnetic tape 250 can also be performed outside the confines of such a specially designed tape drive. In certain non-exclusive alternative embodiments, the media conditioner 255 can be included and/or incorporated within a media manufacturing system, which in some instances can be a reel-to-reel based system. One example of which would be where the media conditioner is included and/or incorporated within a servo writing station, where there are many rollers which guide and/or control motion of the magnetic tape.

The library housing 14 is configured to retain various components of the tape library 10. For example, in the embodiment illustrated in FIG. 1, the plurality of storage slots 18, the rack assembly 22, the retrieval assembly 24, the one or more tape drives 26 of the tape drive system 12, the power supply 28, the library control system 30, the rack(s) 32, and the climate controller 35 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped cross-section or any other suitable shaped cross-section. Further, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the tape cartridge(s) 20. More particularly, in various embodiments, each of the storage slots 18 is configured to receive and retain a single tape cartridge 20. It is noted that no tape cartridges 20 are shown as being retained within the storage slots 18 in FIG. 1 for clarity.

The tape library 10 can include any suitable number of storage slots 18, and/or the tape library 10 can be designed to retain any suitable number of tape cartridges 20. Moreover, the storage slots 18 can be arranged within the tape library 10 in any suitable manner. For example, in certain embodiments, the tape library 10 can include forty storage slots 18 arranged in two four-by-five storage areas. More particularly, in this embodiment, the tape library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the tape library 10 can include greater than forty or fewer than forty storage slots 18 and/or the storage slots 18 can be arranged in a different manner than is illustrated and described in relation to FIG. 1. For example, in certain non-exclusive alternative embodiments, the tape library 10 can be configured to include hundreds or even thousands of storage slots 18, each being configured to receive and retain a separate tape cartridge 20.

The design and configuration of the rack assembly 22 can be varied to suit the specific requirements of the tape library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a tape cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The tape storage retrieval assembly 24 selectively, e.g., upon request of a user or host application, retrieves and moves the tape cartridge 20 as desired between the storage slots 18 and the tape drives 26. In particular, during use, upon receiving a signal from the library control system 30 to access a certain tape cartridge 20, the retrieval assembly 24 can be manipulated to physically retrieve the requested tape cartridge 20 from its associated storage slot 18 in the tape library 10. Subsequently, the retrieval assembly 24 moves the tape cartridge 20 to an appropriate tape drive 26, and inserts the tape cartridge 20 into a drive housing 40 of the tape drive 26 so that the requested read/write operations can be performed, and/or so that a desired conditioning procedure can be undertaken for the magnetic tape 250 retained within the tape cartridge 20, i.e. through use of the specially designed tape drive 26 of the present invention. Upon completion of the requested read/write operations and/or conditioning procedure, the retrieval assembly 24 can then return the tape cartridge 20 to an appropriate storage slot 18.

It is appreciated that although a single retrieval assembly 24 is illustrated in FIG. 1, the tape library 10 can be designed to include more than one retrieval assembly 24. For example, in one non-exclusive alternative embodiment, the tape library 10 can include two retrieval assemblies 24 that function in different portions of the tape library 10 and/or that provide redundancy in the event that one of the retrieval assemblies 24 fails.

The one or more tape drives 26 can be configured for reading and/or writing data with respect to the tape cartridge 20. Further, as noted, at least one of the tape drives 26 can be additionally or alternatively configured for performing a desired conditioning procedure on the magnetic tape 250 retained within the tape cartridge 20, preferably prior to the tape cartridge 20 being inserted into and used within any of the other tape drives 26. Various features of such tape drives 26 that are configured for performing the desired conditioning procedure on the magnetic tape 250 retained within the tape cartridge 20 will be described in detail herein below.

The number of tape drives 26 provided within the tape library 10 can be varied to suit the specific requirements of the tape library 10. For example, in certain embodiments, the tape library 10 can include three tape drives 26 that are stacked substantially one on top of another (with limited spacing therebetween). Alternatively, the tape library 10 can include greater than three or fewer than three tape drives 26 and/or the tape drives 26 can be positioned in a different manner relative to one another. For example, in certain non-exclusive alternative embodiments, the tape library 10 can be configured to include one hundred or more tape drives 26.

In certain embodiments, the tape library 10 can include more than a single tape drive system 12 for purposes of providing the one or more tape drives 26. For example, in some embodiments, the tape library 10 can include a plurality of tape drive systems 12, with each tape drive system 12 including one or more individual tape drives 26. In one such embodiment, the tape library 10 can include three individual tape drive systems 12, with each tape drive system 12 including a single tape drive 26, to provide a total of three tape drives 26 for the tape library 10. Alternatively, the tape library 10 can include any desired number of tape drive systems 12 and/or tape drives 26.

The power supply 28 provides electrical power in a well-known manner to the one or more tape drives 26, the retrieval assembly 24, the library control system 30 and/or additional tape libraries 10. The power supply 28 can be interfaced with these components as well as with an external power source in a well-known manner using industry standard cabling and connections. Alternatively, the power supply 28 can be interfaced with these components in another manner.

The library control system 30 provides the desired and necessary control for oversight functionality of the tape library 10. The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors, and/or for controlling the climate controller 35. Further, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the tape library 10 in a different position or manner than that illustrated in FIG. 1.

Additionally, the tape library 10 can use well-known industry standard cabling and communication protocols between the library control system 30 and other structures of the tape library 10. Cabling and electrical characteristics including signaling protocols can be generally standardized, and the logical message protocols can be either proprietary or standardized as known to those skilled in the art.

As shown, the tape library 10 can also include the GUI 34, such as an interactive touchscreen graphical user interface or another suitable graphical user interface, which allows the user or host to interact with and/or transmit requests or commands to and/or from the tape library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on a climate outside of the library interior 16. As noted, in certain embodiments, the climate controller 35 includes the temperature controller 36 and the humidity controller 38.

The temperature controller 36 regulates and/or adjusts the temperature within the library interior 16 of the tape library 10. The design and/or particular type of temperature controller 36 included in the tape library 10 can vary. For example, the temperature controller 36 can include any suitable type of cooling unit that can selectively lower the temperature within the library interior 16; and/or the temperature controller 36 can include any suitable type of heating unit that can selectively increase the temperature within the library interior 16. In various embodiments, the temperature controller 36 can include one or more temperature sensors 42 (only one temperature sensor 42 is illustrated in FIG. 1) that can sense an ambient temperature within or outside of the library interior 16. The temperature sensor(s) 42 can have any suitable design and/or can be positioned in any suitable location(s), such as within and outside of the library interior 16 of the tape library 10. In certain embodiments, the temperature controller 36 can receive data from the temperature sensor 42, and automatically adjust and/or control the temperature within the library interior 16 in accordance with predetermined temperature standards based on such data.

The humidity controller 38 regulates and/or adjusts the humidity within the library interior 16 of the tape library 10. The design and/or particular type of humidity controller 38 included in the tape library 10 can vary. For example, the humidity controller 38 can include any type of humidifier or dehumidifier, or any other suitable type of humidity controller 38 that can selectively change and/or control the humidity within the library interior 16. In various embodiments, the humidity controller 38 can include one or more humidity sensors 44 (only one humidity sensor 44 is illustrated in FIG. 1) that can sense the humidity within or outside of the library interior 16. The humidity sensor(s) 44 can have any suitable design and/or can be positioned in any suitable location(s), such as within and outside of the library interior 16 of the tape library 10. In certain embodiments, the humidity controller 38 can receive data from the humidity sensor 44, and automatically adjust and/or control the humidity within the library interior 16 in accordance with predetermined humidity standards based on such data.

FIG. 2 is a simplified schematic top view illustration of a magnetic tape drive 226, and a magnetic tape cartridge 220 that has been inserted into the tape drive 226, which can be included as part of the tape library system 10 illustrated in FIG. 1. As shown, the tape cartridge 220 is configured to retain a magnetic tape 250. It is appreciated that the tape drive 226 as shown in FIG. 2, in certain aspects, represents a generic tape drive in terms of overall size, shape and design, and is shown by way of example and not by way of limitation.

However, it is further appreciated that the tape drive 226 includes certain features and/or limitations as described that enable the tape drive 226 to perform the desired conditioning process relative to the magnetic tape 250 that is retained within the tape cartridge 220. In particular, in various embodiments, the tape drive 226 includes a media conditioner 255 that is configured to condition the magnetic tape 250 to remove any excess abrasives, contaminants and/or unwanted lubricants that may otherwise be present on the magnetic tape 250.

In some embodiments, the tape drive 226 operates in compliance with an LTO specification, such as LTO-8 or LTO-9. Stated in another manner, in such embodiments, the tape cartridge 220 is an LTO-compatible tape cartridge.

During use of the tape drive 226, the tape cartridge 220 is inserted into the tape drive 226 to read data from and/or write data to the magnetic tape 250 and/or to perform the desired conditioning process on the magnetic tape 250. More specifically, as illustrated, the tape drive 226 includes a drive housing 226A that is configured to receive the tape cartridge 220 so that the tape drive 226 can read data from and/or write data to the magnetic tape 250 and/or to perform the desired conditioning process on the magnetic tape 250. Additionally, as shown in FIG. 2, various components of the tape drive 226, including at least the media conditioner 255, are coupled to and/or positioned substantially within the drive housing 226A.

As shown, the tape cartridge 220 includes a cartridge reel 246 that includes and/or defines a cartridge hub 248. The magnetic tape 250 is spooled about the cartridge hub 248 of the cartridge reel 246. In certain embodiments, the magnetic tape 250 can include at least one servo track (not shown) and a plurality of data tracks (not shown) that run along a longitudinal length of the magnetic tape 250. Each of these tracks can be positioned substantially parallel to each other.

The tape cartridge 220 supplies the magnetic tape 250 to the tape drive 226. More particularly, when the tape cartridge 220 is inserted into the drive housing 226A of the tape drive 226, one end of the magnetic tape 250 is taken up within the tape drive 226 to be wrapped around a drive reel 252 included in the tape drive 226. The magnetic tape 250 traverses a predefined path 251 (illustrated as a two-headed arrow) between the cartridge reel 246 and the drive reel 252, which is defined, a least in part, by one or more rollers 254 (four are shown in FIG. 2) positioned at strategic positions along the predefined path 251. The rollers 254 may also aid in limiting gross lateral movement (i.e. in and out of the page as shown in FIG. 2) of the magnetic tape 250, i.e. lateral tape motion or "LTM". In some embodiments, the rollers 254 can include a flange at the top and/or the bottom of the roller 254 to assist in limiting lateral tape motion of the magnetic tape 250. Alternatively, in other embodiments, the rollers 254 can be designed without any flanges, i.e. as flangeless rollers.

As the magnetic tape 250 moves along the predefined path 251, the rollers 254 are generally configured to rotate at a nominal rotation rate that corresponds with the lateral tape speed of the magnetic tape 250 along the predefined path 251.

In some embodiments, as shown, the media conditioner 255 can be included and/or incorporated into one of the rollers 254, such that one of the rollers 254 is provided as a modified roller 270 that is configured to condition the magnetic tape 250 of undesired abrasiveness, contaminants and/or lubricants. For example, in the embodiment illustrated in FIG. 2, the media conditioner 255 is included and/or incorporated into the first roller 254 that would be encountered by the magnetic tape 250 when the tape cartridge 220 is inserted into the tape drive 226. Stated in another manner, the first roller 254 is provide as a modified roller 270 that is included and/or incorporated as part of the media conditioner 255. Alternatively, the media conditioner 255 can be included and/or incorporated into another suitable roller 254.

Along the predefined path 251, the drive reel 252 moves the magnetic tape 250 across a head assembly 256 (also sometimes referred to herein simply as a "head") that is configured to read data from and/or write data to the magnetic tape 250. Thus, as provided herein, it is generally preferred that the magnetic tape 250 is conditioned early along the predefined path 251, e.g., with the media conditioner 255 being included and/or incorporated into the first roller 254, or another suitable roller 254 before the magnetic tape 250 initially reaches the head assembly 256, to most effectively inhibit any potential damage to the head assembly 256. Stated in another manner, in various embodiments, the media conditioner 255 is configured and/or positioned within the tape drive 226 in a manner such that the media conditioner 255 conditions the magnetic tape 250 prior to the magnetic tape 250 being moved across the head assembly 256.

In alternative embodiments, the head assembly 256 can include at least one read head, at least one write head, and at least one read/write head. In particular, the head assembly 256 is positioned in close proximity to the predefined path 251 of the magnetic tape 250 such that as the magnetic tape 250 travels in the longitudinal direction (by being wound from the cartridge reel 246 to the drive reel 252 or vice versa) the head assembly 256 can read/write data to particular tracks and longitudinal positions of the magnetic tape 250. Additionally, the head assembly 256 and/or a separate head assembly can include one or more servo elements configured to read the servo track(s) of the magnetic tape 250 in order to effectively maintain proper alignment between the head assembly 256 and the magnetic tape 250. It is appreciated that the tape drive 226 can include any suitable number of heads within the head assembly 256 for purposes of reading data from and/or writing data to the magnetic tape 250. For example, in one non-exclusive embodiment, the head assembly 256 can include 32 heads for purposes of reading data from and/or writing data to 32 data tracks on the magnetic tape 250.

In some embodiments, as shown, the tape drive 226 can also include a cartridge reel motor 258 (illustrated as a box in phantom) that generates the necessary force to rotate the cartridge reel 246 at will, and a cartridge reel encoder 260, e.g., a sensor or detector, that is configured to output signals representing the pulse rate (or rotation rate) of the cartridge reel motor 258. Additionally, the tape drive 226 can further include a drive reel motor 262 (illustrated as a box in phantom) that generates the necessary force to rotate the drive reel 252 at will, and a drive reel encoder 264, e.g., a sensor or detector, that is configured to output signals representing the pulse rate (or rotation rate) of the drive reel motor 262.

As illustrated in this embodiment, the tape drive 226 also includes an actuator 266 and a drive controller 268 that can be communicatively coupled to the head assembly 256. The actuator 266 is configured to control the lateral position of the head assembly 256 and/or the individual heads of the head assembly 256 relative to the magnetic tape 250 based on a signal provided by the drive controller 268. As such, the actuator 266 comprises a mechanical positioner to move the head assembly 256 up or down laterally. By controlling the lateral position of the head assembly 256 relative to the magnetic tape 250, particular tracks of the magnetic tape 250 can be accessed as desired. Alternatively, the tape drive 226 can include more than one actuator 266. For example, the tape drive 226 can include a separate actuator 266 for each head.

The drive controller 268 is in communication with the actuator 266 and a number of other components within the tape drive 226. For example, although not specifically shown in FIG. 2, each of the cartridge reel motor 258, the cartridge reel encoder 260, the drive reel motor 262, and the drive reel encoder 264 can be in communication with the drive controller 268. As such, the drive controller 268 can be configured to perform various specified operations, either individually, or in combination with other software, hardware and/or firmware elements. For example, the drive controller 268 can be used to control the nominal lateral tape speed of the magnetic tape 250 moving along and/or across the rollers 254 by controlling the cartridge reel motor 258 and/or the drive reel motor 262.

Additionally, in certain embodiments, the drive controller 268 can be further configured to control certain aspects and/or components of the media conditioner 255. For example, in some such embodiments, the drive controller 268 can control certain aspects and/or components of the media conditioner based at least in part on feedback that is received by the drive controller 268 during use of the specially designed tape drive 226 that includes the media conditioner 255.

The media conditioner 255 is configured to condition the magnetic tape 250 to remove any excess abrasives, contaminants and/or unwanted lubricants that may otherwise be present on the magnetic tape 250. The design of the media conditioner 255 can be varied to suit the specific requirements of the tape drive 226 and/or the tape library 10 (illustrated in FIG. 1). In certain embodiments, the media conditioner 255, as included and/or incorporated within the first roller 254, can include a modified roller 270 that is configured to rotate during movement of the magnetic tape 250 along the predefined path 251, and a braking mechanism 272 that is configured to provide a braking force on the modified roller 270 to slow the rotation of the modified roller 270. Additionally, in some such embodiments, the modified roller 270 includes a roller body 274 and an outer coating 276 that is affixed on an outer surface 274A of the roller body 274. Alternatively, in other embodiments, the media conditioner 255 can include more components or fewer components than those specifically illustrated and described in relation to FIG. 2. Still alternatively, the media conditioner 255 can have another suitable design for purposes of removing any excess abrasives, contaminants and/or unwanted lubricants that may otherwise be present on the magnetic tape 250. For example, in certain non-exclusive such alternative embodiments, the media conditioner 255 can include cloth rollers, brushes, air jets, ALTC blades, or other suitable conditioning devices.

The modified roller 270, similar to the regular rollers 254, is configured to rotate as the magnetic tape 250 moves along and/or past the modified roller 270 as the magnetic tape 250 moves along the predefined path 251. In various embodiments, the modified roller 270 is approximately the same size in diameter and/or circumference as each of the other rollers 254. Alternatively, the size of the modified roller 270 in terms of diameter and/or circumference can be slightly different than, either slightly larger or slightly smaller than, each of the other rollers 254.

In some embodiments, the modified roller 270, and each of the other rollers 254, can have a circumference of approximately one inch. Alternatively, the modified roller 270, and each of the other rollers 254, can have a circumference that is greater than one inch or less than one inch.

The roller body 274 is configured to be circular disk-shaped, and typically will be approximately the same size as each of the other rollers 254, or perhaps only slightly smaller than each of the other rollers 254, such that the overall size of the modified roller 270 is approximately the same size as each of the other rollers 254. Additionally, in alternative embodiments, the roller body 274 can be designed with or without flanges at the top and/or bottom of the roller body 274 in order to provide a modified roller 270 that either has flanges or is flangeless.

The roller body 274 can be formed from any suitable materials. For example, in various embodiments, the roller body 274 can be formed from any suitable conductive materials. In some non-exclusive such embodiments, the roller body 274 can be formed from one or more of aluminum, aluminum oxide, copper, platinum, gold, silver, beryllium oxide, and boron arsenide. Alternatively, the roller body 274 can be formed from one or more other suitable conductive materials. Based on the certain designs of the braking mechanism 272 as described herein below, it is appreciated, however, that the roller body 274 generally is not made from ferromagnetic materials such as iron or steel that would be attracted to a magnet.

The outer coating 276 is affixed on the outer surface 274A of the roller body 274 and is configured to provide an abrasive surface that can be rubbed against the magnetic tape 250 in order to remove any excess abrasives, contaminants and/or unwanted lubricants that may otherwise be present on the magnetic tape 250. Stated in another manner, the outer coating 276 can be formed from any suitable abrasive materials. For example, in certain non-exclusive alternative embodiments, the outer coating 276 can be formed from one or more of diamond, diamond-like substance, silica, silicon carbide, aluminum oxide, carborundum, glass, boron oxide and emery. Alternatively, the outer coating 276 can be formed from one or more other suitable abrasive materials.

The thickness of the outer coating 276 can be varied. In some embodiments, a thickness of the outer coating 276 can be between approximately 0.1 microns and 0.5 microns. Alternatively, the thickness of the outer coating 276 can be greater than 0.5 microns or less than 0.1 microns. It is appreciated that with the relatively very small thickness of the outer coating 276, the size (diameter and/or circumference) of the roller body 274 of the modified roller 270 can be approximately equal to the full size (diameter and/or circumference) of each of the other rollers 254 that do not include a similar outer coating.

The braking mechanism 272 is configured to slow the rotation of the modified roller 270 and/or the roller body 274 as the magnetic tape 250 moves past and/or along the modified roller 270 during movement along the predefined path 251. More specifically, the braking mechanism 272 is configured so that the modified roller 270 and/or the roller body 274 rotates at a reduced rotational rate that is less than the nominal rotation rate of the other rollers 254 (and the nominal rotation rate of the modified roller 270 if not for the use of the braking mechanism 272). It is appreciated that the braking mechanism 272 being used to control the modified roller 270 to rotate at a reduced rotation rate will have limited or no impact on the nominal lateral tape speed of the magnetic tape 250 as the magnetic tape 250 is moved along the predefined path 251. Thus, the reduced rotation rate of the modified roller 270 in comparison to the maintained nominal lateral tape speed of the magnetic tape 250 will create a "slipping" action between the outer coating 276 and the surface of the magnetic tape 250 which enables the desired conditioning of the surface of the magnetic tape 250.

The design of the braking mechanism 272 can be varied to suit the requirements of the tape drive 226. In certain embodiments, the braking mechanism 272 can be a permanent magnet that generates a magnetic field that interacts with the conductive material of the roller body 274 to produce eddy currents, which, in turn, produce a braking force on the rotation of the roller body 274 and/or the modified roller 270. More specifically, in such embodiments, the desired lapping action is controlled by inserting a permanent magnet that produces eddy current in the back side of the roller body 274 of the modified roller 270, such that as the modified roller 270 rotates, the eddy currents produce braking action on the rotation of the roller body 274 that creates the required lapping action between the magnetic tape 250 and the outer coating 276 affixed to the outer surface 274A of the roller body 274. Thus, during use of the media conditioner 255, the abrasive material of the outer coating 276 rubs against the surface of the magnetic tape 250 to remove the undesired abrasiveness, contaminants and/or luminants from the surface of the magnetic tape 250.

Alternatively, in other embodiments, the braking mechanism 272 can be provided in the form of an electromagnet, and current, as controlled by the drive controller 268, can be sent to the electromagnet to produce the desired eddy currents and thus the desired braking action on the rotation of the roller body 274 of the modified roller 270.

As described herein, eddy currents are loops of electrical current induced within conductors (or conductive material, such as used in the roller body 274) by a changing magnetic field in the conductor. The changing magnetic field in the conductor can be provided by introducing relative movement between the braking mechanism 272, e.g., the permanent magnetic and/or the electromagnet, and the conductive material of the roller body 274. An eddy current creates a magnetic field that opposes the change in the magnetic field that created ft. Thus, the eddy currents as created through use of the braking mechanism 272 exert a drag force that slows the relative movement between the braking mechanism 272 and the roller body 274, thereby causing the roller body 274 to rotate at the reduced rotation rate that is less than the nominal rotation rate.

Still alternatively, in still other embodiments, the braking mechanism 272 can include a motor that is coupled to the modified roller 270. In such embodiments, the motor can be configured and/or servo controlled to slow rotation of the modified roller 270 so that the modified roller 270 rotates at the reduced rotation rate.

Accordingly, in various embodiments, the braking mechanism 272 can be configured and/or controlled by the drive controller 268 so that the modified roller 270 rotates at a reduced rotation rate as compared to the nominal rotation rate. In some such embodiments, the braking mechanism 272 can be configured such that the modified roller 270 rotates at a reduced rotation rate that is less than the nominal rotation rate by between approximately 10% and 90%. More particularly, in such embodiments, the braking mechanism 272 can be configured such that the modified roller 270 rotates at a reduced rotation rate that is less than the nominal rotation rate by approximately 10%, 15%, 20%, 25%, 30%, 35%, 40%, 45%, 50%, 55%, 60%, 65%, 70%, 75%, 80%, 85% or 90%. Stated in another manner, in such embodiments, the reduced rotation rate can be approximately 90%, 85%, 80%, 75%, 70%, 65%, 60%, 55%, 50%, 45%, 40%, 35%, 30%, 25%, 20%, 15% or 10% of the nominal rotation rate.

It is appreciated that when the roller body 274 of the modified roller 270 rotates at low speed, the tape drive 226 can operate normally because the eddy current would be very low and would provide very minimal braking force on the rotation of the roller body 274. Moreover, it is further appreciated that the eddy current braking rotational force is dependent on the size and specific type of magnet used within the braking mechanism 272. In certain applications, it is appreciated that, in general, the eddy current rotational braking force will be negligible with a nominal rotation rate below five revolutions per second.

However, when the roller body 274 of the modified roller 270 is rotating at a higher nominal rotation rate, the eddy current rotational braking force on the rotation can reduce the relative motion between the roller body 274 and the braking mechanism 272 in a controller manner. Moreover, in some applications, the controlled braking force can also remove excess debris away from the magnetic tape 250 and into the airflow and away from the magnetic tape 250. Importantly, as described, the abrasive surface of the outer coating 276 will rub against the surface of the magnetic tape 250 and smooth high-level tape asperities peaks that are known to cause MR recession. The result of the relative "slipping" between the magnetic tape 250 and outer coating 276 of the modified roller 270 results in the desired smoothing of the damaging portion of the abrasive material in the magnetic tape 250 that can otherwise cause damage to the head assembly 256.

During use of the tape drive 226, the magnetic tape 250 can be moved at any desired speed, which will, in turn, cause the rollers 254 to rotate at a particular speed depending upon the size of the roller 254. In one representative example, if the normal tape speed is 200 inches per second, and the circumference of the rollers 254 is one inch, normally, the rollers 254 would rotate at 200 revolutions per second. If the braking mechanism 272, e.g., the permanent magnet or electromagnet, is designed to provide braking to reduce the nominal speed of the modified roller 270 to 100 revolutions per second, (half the roller speed when the nominal tape friction), the actual roller speed, depending on the friction, will adapt from 10-200 RPS depending on the smoothness of the magnetic tape 250. That would be equivalent to grinding at an average speed of 100 RPS and adjusting based on needs. It is appreciated that the slower the rotation of the modified roller 270 (the lower the reduced rotation rate), the more grinding is taking place at the same time because the difference between the reduced rotation rate and the nominal rotation rate is greater. Thus, these opposing non-linear forces can produce a linear-adaptive grinding system.

It is further appreciated that by incorporating the media conditioner 255 as in the present invention into the tape drive 226, the tape drive 226 is easily usable in a tape library 10 at the site of the customer. Moreover, it is appreciated that by using the tape drive 226 of the present invention first, before more standard tape drives are used, the tape library 10 can limit any potential damage to the heads 256 of the tape drives that could otherwise occur due to the excess abrasives, contaminants and/or unwanted lubricants that may be present on the magnetic tape 250.

Additionally, in some embodiments, the tape drive 226 may further include other known cleaning apparatus such cloth rollers, air jets or ALTC blade to remove excess debris from the magnetic tape 250.

In some embodiments, the tape drive 226 can further include a mechanism or method in order to keep the modified roller itself clean. In particular, as the modified roller 270 is used to lap or clean undesired abrasiveness, contaminants and/or unwanted lubricants from the magnetic tape 250, such abrasiveness, contaminants and/or unwanted lubricants can be left as debris on the modified roller 270. In such situations, the tape drive 226 can include a cleaning mechanism, such as a cleaning cloth, brush, air, etc. to keep the modified roller 270 itself clean. Further, in such situations, the tape drive 226 can further include any suitable type of debris cleaning mechanism that can include special debris capturing material that makes contact with the magnetic tape 250 after it has been conditioned by the modified roller 270 in order to catch any loose debris that may be present as a result of the conditioning procedure. In particular, the tape drive 226 can include a debris remover that is configured to catch and remove any loose debris that has been generated due to the use of the media conditioner 255.

Moreover, in certain embodiments, the tape drive 226 can incorporate a feedback loop that enables a better, more efficient conditioning process to be performed by the media conditioner 255. For example, upon receipt of feedback from one or more sensors as to the quality and/or effectiveness of the conditioning process, the drive controller 268 can control various features, aspects and/or conditions of the tape drive 226 such as braking force provided by the braking mechanism 272, nominal rotation rate of the rollers 254, 270 as defined by the nominal linear tape speed, reduced rotation rate of the modified roller 270 as compared to the nominal rotation rate, and/or current sent to the braking mechanism 272 when provided in the form of an electromagnet.

The tape drive 226 can also be modified to provide better, more effective conditioning of the magnetic tape 250 based on feedback through use of such adjustments as different surface roughness or different abrasive materials for the outer coating 276, different sizes (diameter/circumference) of the rollers 254, 270, different wrap angle for the modified roller 270, adjusted alignment for the rollers 254, 270, and/or different types and/or sizes of the braking mechanism 272 (e.g., permanent magnet).

It is understood that although a number of different embodiments of the tape library system have been illustrated and described herein, one or more features of any one embodiment can be combined with one or more features of one or more of the other embodiments, provided that such combination satisfies the intent of the present invention.

While a number of exemplary aspects and embodiments of the tape library system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A tape drive for use in a tape library that retains at least one tape cartridge that retains magnetic tape, the tape drive comprising:
    a drive housing that is configured to receive the tape cartridge; and
    a media conditioner that is coupled to the drive housing, the media conditioner being configured to condition the magnetic tape that is retained within the tape cartridge when the tape cartridge is received within the drive housing, the media conditioner including a modified roller having a roller body and an outer coating that is affixed on an outer surface of the roller body.

2. The tape drive of claim 1 wherein the media conditioner is configured to remove at least one of (i) abrasives, (ii) contaminants, and (iii) lubricants that are on the magnetic tape when the tape cartridge is received within the drive housing.

3. The tape drive of claim 1 wherein the magnetic tape is configured to move along a predefined path within the drive housing when the tape cartridge is received within the drive housing.

4. The tape drive of claim 3 further comprising a drive controller that is configured to control operation of the tape drive, the drive controller being configured to control a lateral tape speed of the magnetic tape as the tape drive moves through the drive housing along the predefined path.

5. The tape drive of claim 4 wherein the predefined path is defined by one or more rollers that are positioned along the predefined path.

6. A tape drive for use in a tape library that retains at least one tape cartridge that retains magnetic tape, the tape drive comprising:
    a drive housing that is configured to receive the tape cartridge; and
    a media conditioner that is coupled to the drive housing, the media conditioner being configured to condition the magnetic tape that is retained within the tape cartridge when the tape cartridge is received within the drive housing, wherein the magnetic tape is configured to move along a predefined path within the drive housing when the tape cartridge is received within the drive housing, wherein the predefined path is defined by one or more rollers that are positioned along the predefined path; and
    a drive controller that is configured to control operation of the tape drive, the drive controller being configured to control a lateral tape speed of the magnetic tape as the tape drive moves through the drive housing along the predefined path;
    wherein one of the one or more rollers includes a modified roller having a roller body and an outer coating that is affixed on an outer surface of the roller body, and wherein the media conditioner includes the modified roller.

7. The tape drive of claim 6 wherein the one or more rollers are configured to rotate at a nominal rotation rate that corresponds to the lateral tape speed as the magnetic tape moves along the predefined path at the lateral tape speed.

8. The tape drive of claim 7 wherein the media conditioner further includes a braking mechanism that is configured to slow rotation of the roller body of the modified roller so that the modified roller rotates at a reduced rotation rate that is less than the nominal rotation rate.

9. The tape drive of claim 8 wherein the reduced rotation rate of the modified roller is less than approximately 75% of the nominal rotation rate.

10. The tape drive of claim 8 wherein the braking mechanism is configured to generate a magnetic field that interacts with a material of the roller body to produce eddy currents that produce a braking force on the roller body so that the modified roller rotates at the reduced rotation rate.

11. The tape drive of claim 8 wherein the braking mechanism includes a permanent magnet.

12. The tape drive of claim 8 wherein the braking mechanism includes an electromagnet.

13. The tape drive of claim 1 wherein the roller body is formed from a conductive material.

14. The tape drive of claim 1 wherein the roller body is formed of one of aluminum and copper.

15. The tape drive of claim 1 wherein the outer coating is formed from one or more of diamond, diamond-like substance, silica, silicon carbide, aluminum oxide, carborundum, glass, boron oxide and emery.

16. The tape drive of claim 3 further comprising a head assembly that is coupled to the drive housing, and wherein the magnetic tape moves across the head assembly as the magnetic tape moves along the predefined path so that the head assembly can one of write data to and read data from the magnetic tape.

17. The tape drive of claim 16 wherein the magnetic tape is conditioned by the media conditioner prior to the magnetic tape moving across the head assembly.

18. The tape drive of claim 1 further comprising a debris remover that is configured to remove any debris that has been generated due to the use of the media conditioner.

19. The tape drive of claim 1 wherein the tape cartridge is an LTO-compatible tape cartridge.

20. A method for conditioning a magnetic tape that is retained within a tape cartridge, the method comprising the steps of:

receiving the tape cartridge within a drive housing of a tape drive;

coupling a media conditioner to the drive housing; and conditioning the magnetic tape that is retained within the tape cartridge with the media conditioner when the tape cartridge is received within the drive housing, the media conditioner including a roller having a roller body and an outer coating that is affixed on an outer surface of the roller body.

* * * * *